Figure 4:
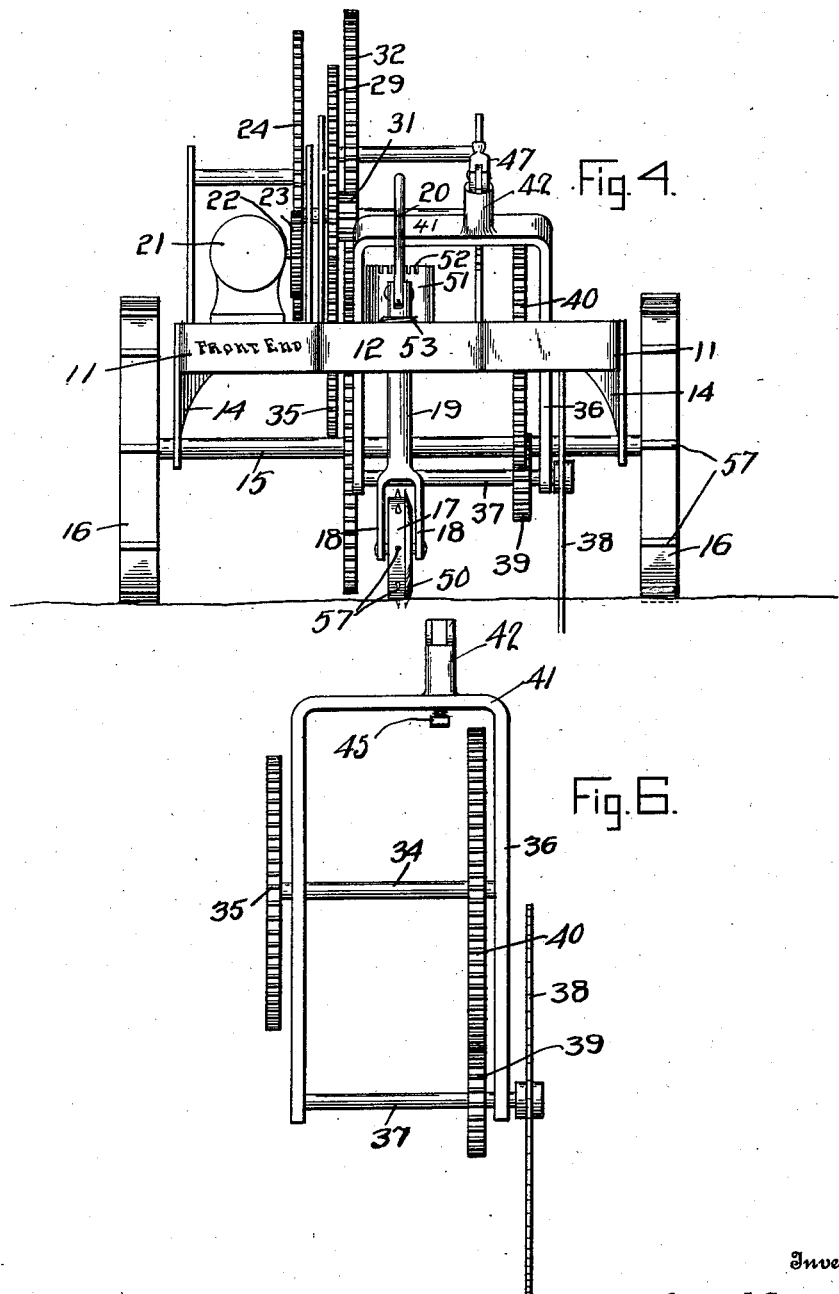

G. L. STRAIT.
ICE CUTTING MACHINE.
APPLICATION FILED JULY 17, 1908.
1,012,745.
Patented Dec. 26, 1911.
4 SHEETS—SHEET 1.
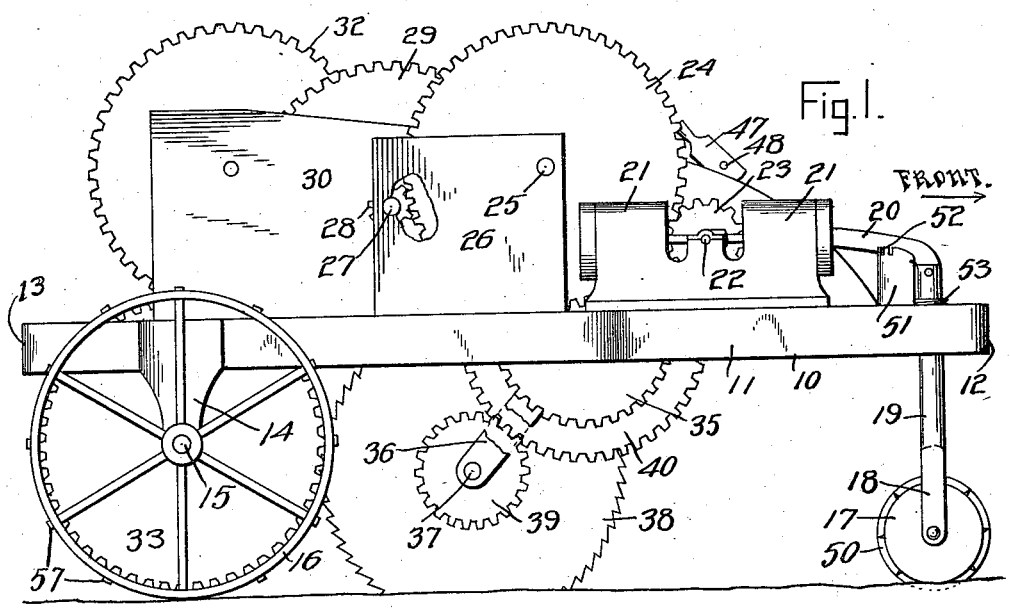
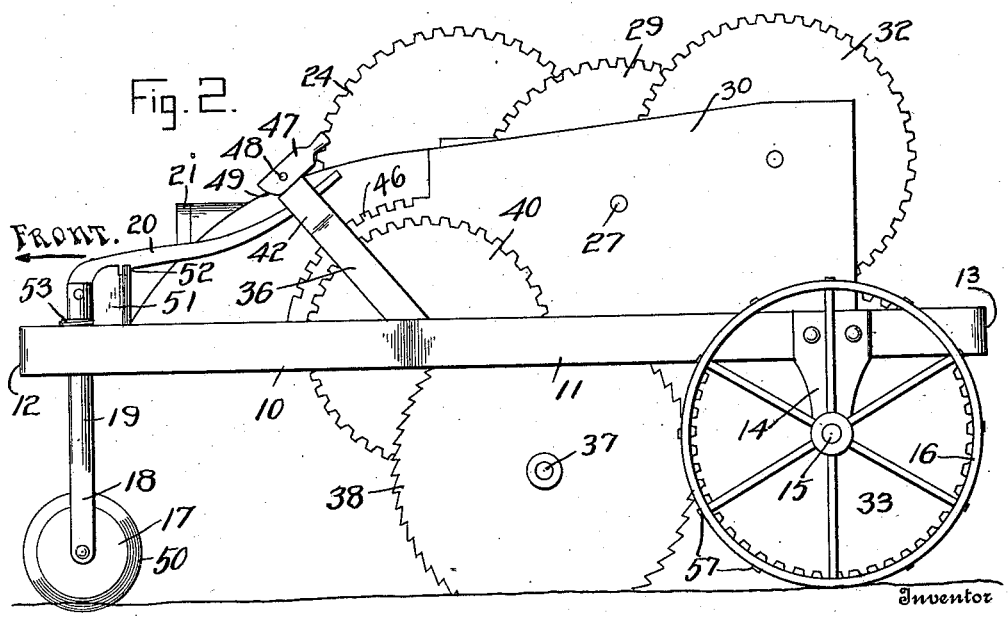
Inventor
George L. Strait G. L. STRAIT.
ICE CUTTING MACHINE.
APPLICATION FILED JULY 17, 1908.
1,012,745.
Patented Dec. 26, 1911.
4 SHEETS—SHEET 2.
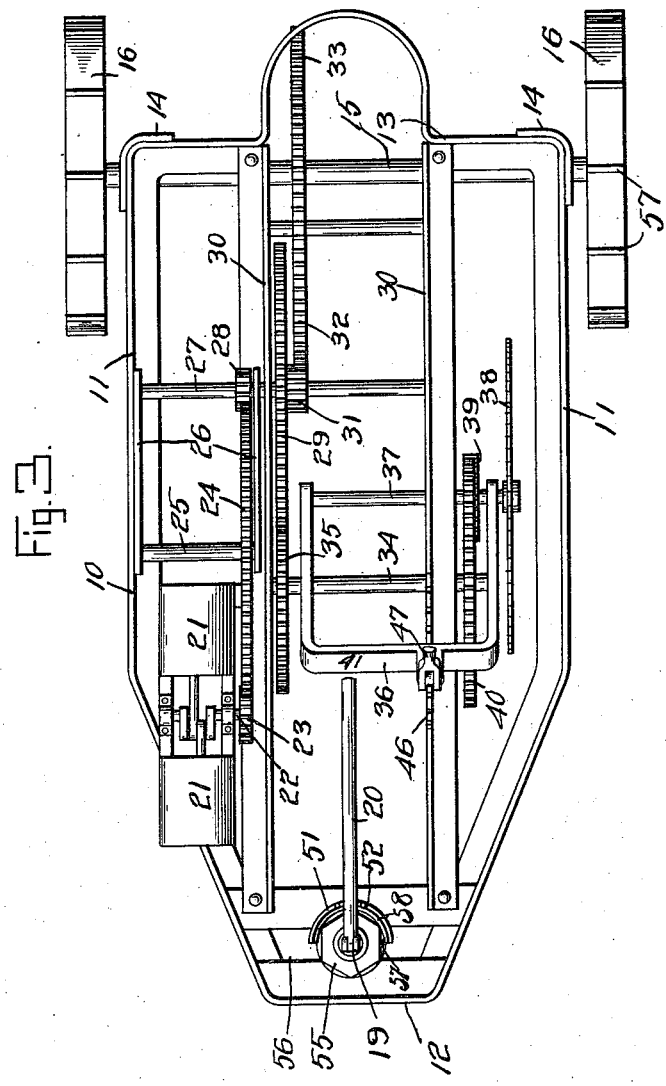
Fig. 3.
Witnesses
Inventor
George L. Strait.
Attorneys.

G. L. STRAIT.
ICE CUTTING MACHINE.
APPLICATION FILED JULY 17, 1908.

1,012,745.

Patented Dec. 26, 1911.
4 SHEETS—SHEET 4.

Inventor
George L. Strait

Witnesses

By

Attorneys

UNITED STATES PATENT OFFICE.

GEORGE L. STRAIT, OF WINSTED, CONNECTICUT.

ICE-CUTTING MACHINE.

1,012,745. Specification of Letters Patent. Patented Dec. 26, 1911.

Application filed July 17, 1908. Serial No. 444,052.

*To all whom it may concern:*

Be it known that I, GEORGE L. STRAIT, a citizen of the United States, residing at Winsted, in the county of Litchfield, State of Connecticut, have invented certain new and useful Improvements in Ice-Cutting Machines; and I do hereby declare the following to be a full, clear, and exact description of the invention, such as will enable others skilled in the art to which it appertains to make and use the same.

The invention relates to an ice cutting machine and more particularly to the class of self propelled ice cutting machines.

The primary object of the invention is the provision of an ice cutting machine comprising a wheeled frame having mounted thereon a motor for driving the wheeled frame to cause the travel of the same and an adjustable ice cutter mounted on the said frame whereby the cutter can be moved from an operative to an inoperative position and which ice cutter is actuated by the motor on the wheeled frame.

Another object of the invention is the provision of an ice cutting machine comprising a motor-propelled vehicle carrying a circular saw or ice knife mounted in a swinging support carried by the motor vehicle and which circular saw or ice knife is actuated by the motor of the vehicle and means for locking the swinging support in various angular adjusted positions whereby the depth of the cutting action of the circular saw or ice knife is under the direct control of the operator of the motor vehicle.

A further object of the invention is the provision of an ice cutting machine of the self-propelling motor vehicle type which is simple in construction, efficient in operation and inexpensive in the manufacture.

In the drawings accompanying and forming part of this specification is illustrated one form of embodiment of the invention which to enable those skilled in the art to practice the same will be set forth at length in the following description while the novelty of the invention will be included in the claim succeeding said description. If deemed desirable changes, variations and modifications may be resorted to such as come properly within the scope of the claim hereunto appended without departing from the spirit of the invention.

Figure 5:
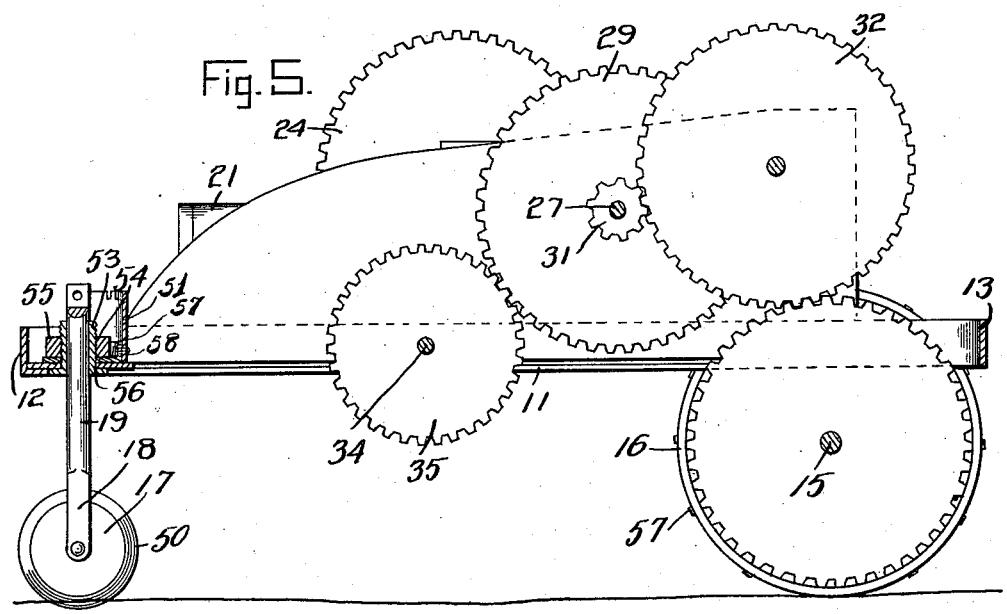
Figure 7:
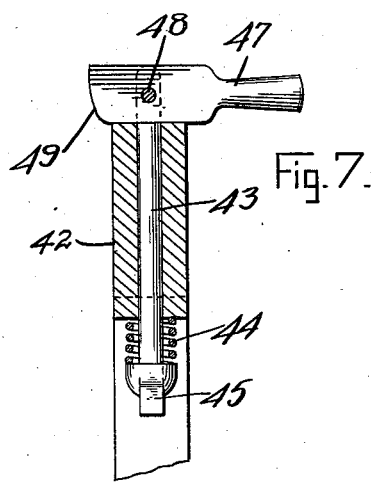

In the drawings—Figure 1 is a view in elevation of one side of the machine. Fig. 2 is a similar view of the opposite side of the machine. Fig. 3 is a top plan view thereof. Fig. 4 is a front view. Fig. 5 is a longitudinal sectional view of the machine. Fig. 6 is a detail view of the circular saw frame. Fig. 7 is a fragmentary sectional view of the cam and dog for locking the saw supporting bracket.

In the drawings, the numeral 10 designates generally the main frame of the machine comprising side rails 11, front and rear rails 12 and 13 respectively to form the open unitary frame structure and depending from opposite sides of the rear end of the main frame 10 are brackets 14 having rotatably journaled therein a rear driving axle 15 carrying fixed traction wheels 16 the latter being of the ordinary construction. At the front end of the main frame 10 is a guide wheel 17 the latter rotatably mounted between spaced arms 18 of a stem 19 the latter swiveled centrally in the main frame at the front thereof and pivotally connected to the upper end of the said stem 19 is a steering lever 20 which is controlled by the operator of the machine.

Mounted upon the main frame 10 at one side thereof is a double cylinder air-cooled engine or motor 21 the same being of the ordinary and conventional form and having connected to its driving shaft 22 a toothed pinion or cog wheel 23, the latter in mesh with a large driven gear 24 fixed to a shaft 25 having its bearing in spaced vertically disposed plates 26 mounted upon the main frame of the machine. In the vertically disposed plates 26 is journaled a transverse driven shaft 27 having a pinion 28 in mesh with the large driven gear 24 which latter actuates or rotates said transverse shaft.

Upon the driven shaft 27 is fixed a large gear 29 the latter positioned upon the said shaft between spaced parallel bearing plates 30 arranged longitudinally of the main frame centrally thereof. Integral with the large gear 29 and upon the shaft 27 is a pinion 31 the latter being in mesh with a gear wheel 32 which is in mesh with and drives a gear 33 fixed to the rear axle 13 of the machine whereby motion is imparted to the traction wheels to cause the travel of the said machine.

Journaled in the bearing plates 30 is a rotatable shaft 34 which receives its motion through the medium of a gear 35 in mesh with the gear wheel 29. Upon the rotatable shaft 34 is mounted for swinging movement an inverted U-shaped bracket or support 36 having journaled in its lower end a shaft forming a rotatable arbor 37 carrying a circular saw or ice knife 38 and which arbor or shaft 37 has fixed thereto a pinion 39 in mesh with a gear wheel 40 fixed to the rotatable shaft 34 whereby motion is imparted from the engine to the circular saw or ice knife of the machine.

To one side of the center of the cross piece 41 of the U-shaped swinging support 36 is a sleeve 42 in which is slidably mounted a rod 43 controlled by a tension spring 44 having one end bearing against the cross piece 41 and its opposite end against a dog 45 normally held in engagement with a toothed segment 46 formed on one of the bearing plates 30 whereby the swinging support can be locked in various angular positions to regulate the depth of cutting action of the circular saw or ice knife 38 and also permit the latter to be shifted from an operative to an inoperative position with respect to the ice to be cut on a pond or the like.

To release the dog 45 or to bring the same out of engagement with the segment 46 there is provided a release lever 47 pivotally connected as at 48 to the end of the rod 43 and which lever has cam extensions 49 working against the sleeve 42 of the swinging support so as to raise and lower the said rod in the latter and this release lever is adapted to be actuated by the operator of the machine.

On the tread of the guide wheel 17 is an outwardly projecting sharpened rib 50 the latter adapted to cut into the ice upon the travel of the machine and to prevent slipping of the guide wheel as the said machine moves upon the ice.

Projecting upwardly from the front portion of the main frame 10 is an arcuate shaped plate 51 having its upper edge formed with a plurality of spaced notches 52 to receive and lock the steering lever 20. The stem 19 of the guide wheel 17 is swiveled in a vertical sleeve 53 having exterior threads 54 engaged by a lock nut 55, which latter adjustably secures the sleeve 53 in a transverse slot or opening 56 across the front of the main frame to permit the shifting of the front guide wheel, so the rib 50 of said wheel can engage the cut in the ice previously formed by the ice saw to facilitate the proper alinement of the machine with respect to the said previous line cut into the ice thereby. Disposed below the lock nut 55 is a plate 57 which is provided with an upwardly extending flange 58 that is secured to the lower edge of the arcuate plate 51 by rivets or other suitable means. Thus it will be observed that when the stem 19 is shifted along the slot 56, the arcuate plate 51 is also moved therewith so as to be in proper position for receiving the lever 20.

The traction wheels 16 and guide wheel 17 have peripheral spike teeth 57 to bite into the ice upon the advancement of the machine to form anti-slipping means for said wheels.

What is claimed is—

In an ice cutting machine, a main frame including a shaft and a toothed segment, a U-shaped swinging support mounted upon the shaft and provided in its cross-piece with an opening disposed above the segment, a saw carried by the support, a motor supported by the frame, actuating means for the saw connected to the motor, a rod disposed within the opening of the support and provided at its lower end with a dog adapted for engagement with the segment, a tension spring disposed around the rod intermediate the cross-piece and the dog, and a locking lever fulcrumed intermediate its ends to the other end of the rod for engaging with the cross-piece of the support.

In testimony whereof, I affix my signature, in presence of two witnesses.

GEORGE L. STRAIT.

Witnesses:
ALBERT WEBB,
HOWARD H. EGGLESTON.